E. R. HEWITT.
DRIVE MECHANISM FOR AUTOMOBILES.
APPLICATION FILED JUNE 22, 1915.

1,224,543.

Patented May 1, 1917.
2 SHEETS—SHEET 1.

Attest:

Inventor:
Edward R. Hewitt,
by his Atty.

E. R. HEWITT.
DRIVE MECHANISM FOR AUTOMOBILES.
APPLICATION FILED JUNE 22, 1915.

1,224,543.

Patented May 1, 1917.
2 SHEETS—SHEET 2.

Attest:

Inventor:
Edward R. Hewitt,
by his Atty.

UNITED STATES PATENT OFFICE.

EDWARD R. HEWITT, OF MIDVALE, NEW JERSEY.

DRIVE MECHANISM FOR AUTOMOBILES.

1,224,543.

Specification of Letters Patent.

Patented May 1, 1917.

Application filed June 22, 1915. Serial No. 35,536.

*To all whom it may concern:*

Be it known that I, EDWARD R. HEWITT, a citizen of the United States, resident of Midvale, in the county of Passaic, State of New Jersey, have invented certain new and useful Improvements in Drive Mechanisms for Automobiles, of which the following is a specification, reference being had to the accompanying drawings, forming a part hereof.

My invention relates to the drive mechanism for automobiles, and more particularly to a form of spring drive rear axle construction advantageous in various respects, as will hereinafter appear. Among the objects is a construction which will increase the amount of time which the engine pulls before the rear wheels are obliged to move, particularly in the case of worm gear drive. The strain on the worm gear when starting, or in the case of any sudden change of motion, is such as to produce wear and injury to the gears, and in my construction the worm drive is moved, or, when the vehicle is started the worm drive begins its motion under the light load of a spring, before the heavy load of starting the vehicle is encountered. While the general idea of a spring drive has heretofore been suggested, my invention provides for a simple, compact and accessible construction peculiarly adapted to automobile truck mechanism, and is also well protected and advantageous in various other ways.

A particular embodiment of my construction is shown in the drawings, in which.

Figure 1:
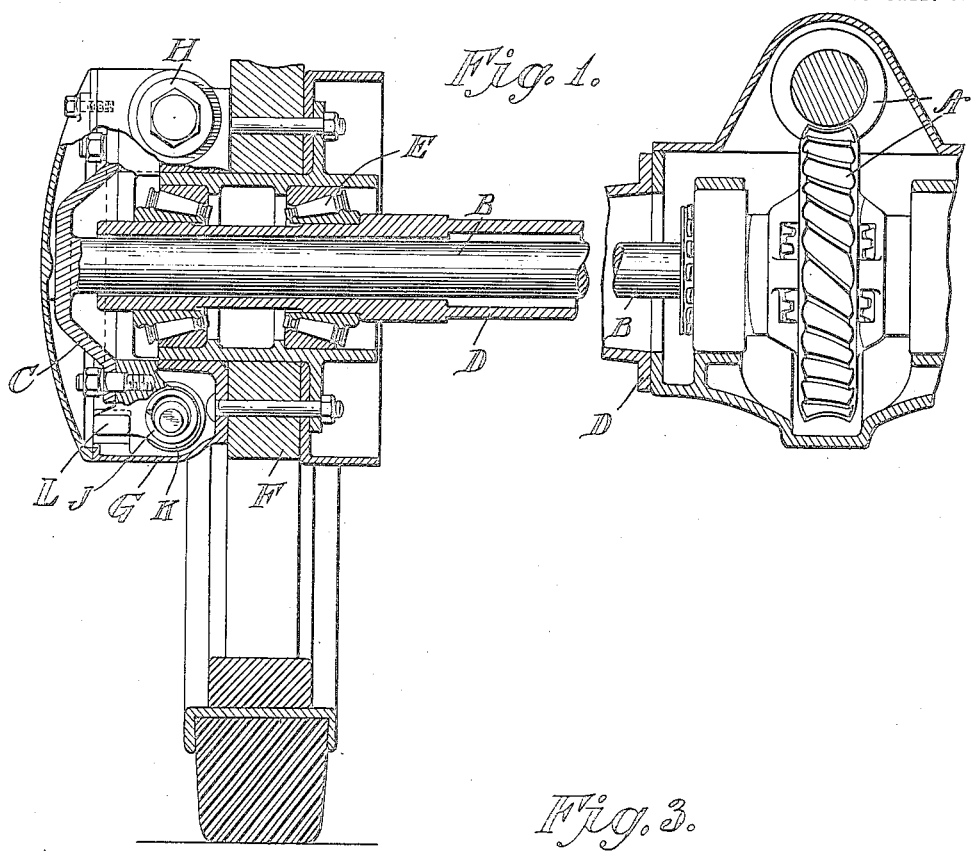
Figure 1 shows the middle and end section of a rear axle worm drive.
Figure 3:
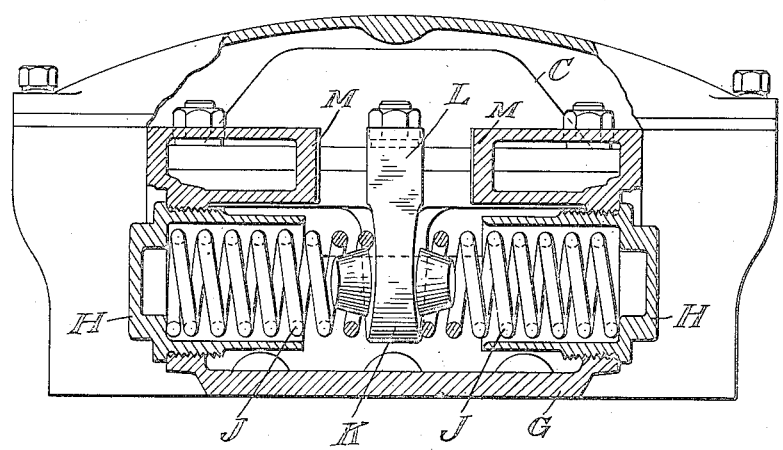
Fig. 3 is a section at 3—3 of Fig. 2.
Figure 2:
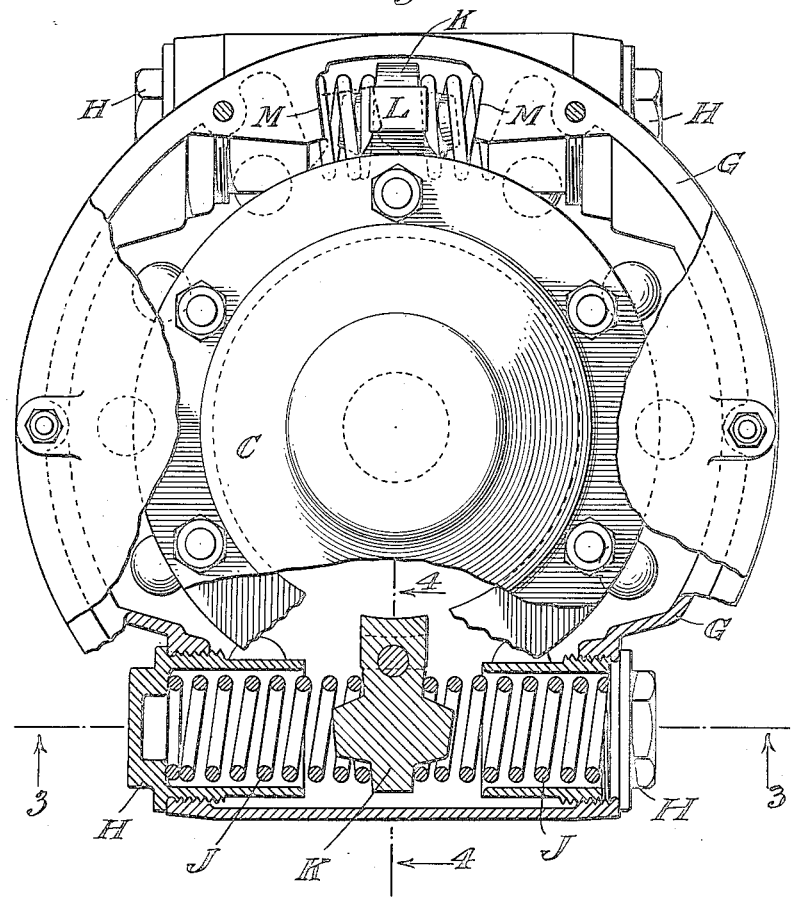
Fig. 2 is an end view of the hub end of the axle, part broken away.
Figure 4:
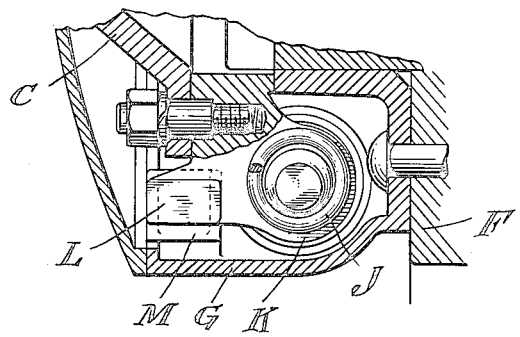
Fig. 4 is a section of Fig. 2 at 4—4.

The worm gears A drive the shaft section B through suitable compensating connections, while the end of the shaft section has the flange C. The housing D surrounds the shaft B, carrying bearings E, supporting the wheel hub F. The outer portion of the wheel hub has a casing G, in which are mounted caps H—H in two pairs, supporting springs J—J, between which lies a lug K securely bolted or formed integral with the flange C at the end of the axle section. On this lug is also formed a stop L adapted to engage with stops M—M formed on the hub member G.

It will thus be seen that the worm drive operated by the engine will turn the axle section B, and through it the flange C, thereby moving the lug K and compressing the springs J, during the first movement of the worm drive. The resistance to the turning increases on account of the spring, and if the resistance to starting causes a complete compression of the spring, then the lug moves to such an extent relative to the hub, that the stop L engages the abutment M, after the worm drive has commenced turning, thereby giving a predetermined amount of time of worm drive and engine motion before the full resistance of starting the vehicle must be overcome. Accordingly a gradually increasing strain is taken up by the worm drive, avoiding wear and tear which today result in the usual construction of drive mechanism of this character.

Having two lugs K diametrically opposite and each acting between two springs, a uniform twisting-effort is produced. The arrangement for this and other reasons is such that springs can be used of a size which do not cause the hub to be increased beyond permissible limits. The hub cap C incases the entire mechanism, making it dust-proof and avoiding injury and retaining any lubricant or grease that it may be desired to have in the hub, while at the same time inspection, adjustment and repair can be made with the greatest facility.

The caps H are screwed in to permit ready removal of the springs, while the lug K has projections on either side insuring the proper positioning of the springs in a most simple manner.

It will be seen that in addition to the advantages recited, the starting motion will be gradual or any change of speed will be cushioned by my construction, thereby avoiding shock and improving the smooth running of the vehicle and minimizing wear and tear throughout.

My construction may be varied in many respects, while still embodying my invention, but what I claim and desire to secure by Letters Patent is:

1. An automobile drive wheel hub, a rear axle housing supporting said hub, an axle projecting through said housing and engaging by a flange on the end of said axle two lugs within the outer limits of said hub, a projecting casing forming the outer portion of said hub, screw caps tangentially located in said casing and having their axes normally projecting through one of said lugs supported on the outer end of the drive axle, springs in said casing engaging said lug, for the purpose described.

2. In an automobile drive mechanism, a drive wheel, an axle housing, a drive-shaft in said housing, a worm gear operatively attached to said drive shaft and a yielding connection between said drive wheel and drive shaft end comprising a casing, recesses adapted to hold in position a plurality of pairs of coil springs normally in a straight line tangent to said casing, and a lug on the coöperating part located between the two of each of the pairs of springs, for the purpose described.

3. In an automobile drive mechanism, a drive wheel hub, a casing adjacent said hub, a drive axle, means at one end of said drive axle to transmit power and a connection between the other end of said drive axle to deliver the power to the hub including springs adapted to yield against relative rotary movement, removable caps in said casing whereby said yielding springs may be inserted and removed, for the purpose described.

In testimony whereof, I have signed my name to this specification, in the presence of two subscribing witnesses, this 15th day of June, 1915.

EDWARD R. HEWITT.

Witnesses:
H. MUCHMORE,
HERMANN F. CUNTZ.